May 12, 1942.  A. A. BUSCH  2,283,043
AIR DRIER
Filed Aug. 7, 1940

INVENTOR.
ALBERT A. BUSCH
BY Barnes, Kisselle, Laughlin & Raisch
ATTORNEYS.

Patented May 12, 1942

2,283,043

UNITED STATES PATENT OFFICE 2,283,043

AIR DRIER

Albert A. Busch, Detroit, Mich., assignor to Sanozone Corporation, Detroit, Mich., a corporation of Michigan Application August 7, 1940, Serial No. 351,681

5 Claims. (Cl. 183—4)

This invention relates to an air drier, that is, a device for dehumidifying air or any other gas.

Air driers of the type herein described are not broadly new, see the copending application of Clifford H. Kain and Richard J. Schaefer, Serial No. 350,684, filed August 3, 1940.

The object of this invention is to improve on air driers of the adsorptive type heretofore known. Improvement consists in simplifying the construction and thereby appreciably reducing the manufacturing cost of this type of air drier. This simplification in the construction of the air drier also results in a more efficient drying or dehumidification of the gas passing through the drier and a more efficient reactivating of the adsorption material.

Figures 1, 2:
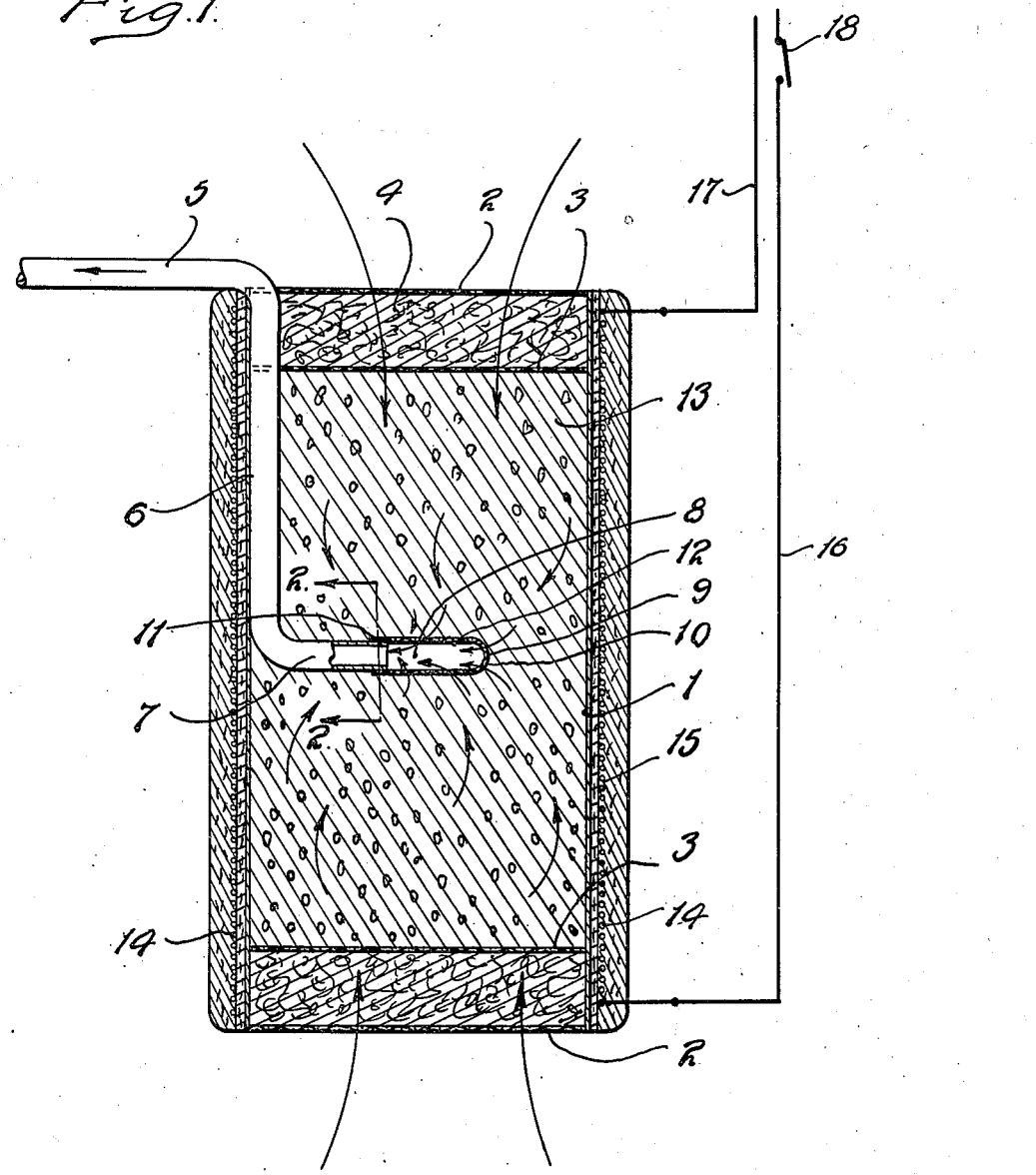
Fig. 1 is a longitudinal cross section through the drier.
Fig. 2 is a section along the line 2—2 of Fig. 1.

This drier is primarily adapted for drying air preparatory to passing the same through an ozone generating cell which changes the oxygen of the air into ozone.

Referring more particularly to the drawing it will be seen that the drier comprises a housing 1 preferably of sheet metal, such as steel, in the form of a cylinder open at each end. Each end of the cylinder is provided with an air filter in the forms of a pair of opposed wire gauze members 2 and 3. The wire gauze members 2 and 3 extend completely across the cylindrical housing 1 and have the space therebetween filled with a suitable air filtering or cleaning material such as glass or rock wool 4. The wire screen members 2 and 3 are fixed to the casing 1.

A conduit 5 is provided for gas and air. This conduit extends along the inside face of the housing 1 and is soldered or otherwise affixed thereto as at 6. The lower end of the line 5 turns inwardly as at 7 so that the inlet opening 8 for the air or other gas is positioned approximately in the middle of the housing 1. A tubular foraminated or screened member 9, provided with a closed end 10 and an open end 11 is placed over the end of the line 7 and secured thereto. Member 9 has its closed end 10 spaced from the inlet 8 of the line 5 to form an open area 12. As shown in Fig. 1 the member 9 extends throughout a relatively small portion of the lateral area of the housing 1. The inside of the housing 1 is filled with any suitable adsorption material 13.

Among the materials which may be used are "Silica Gel," charcoal, active alumina, ferric hydroxide gel. "Silica Gel" is the trade name for a manufactured material obtained by the reaction of a soluble silicate, such as "water glass," and an acid, such as sulphuric; the two components being of definite concentrations and mixed in a definite ratio. The hydrosol of silicic acid thus formed "sets" in a definite time to a hydrogel (a jelly-like mass) which then is washed free from excess acid and salts. The washed hydrogel is finally dried, sized and heat treated at a definite temperature. "Silica Gel" is a hard, glassy material, similar in appearance to clear quartz granules which are light and highly porous. The internal structure of "Silica Gel" consists of a myriad of thin-walled capillaries. Although the other adsorbent materials mentioned above can be used, the preferred adsorbent material is this hydrogel known as "Silica Gel."

An electrical resistance element 14 is provided on the outside of the housing 1. Between the resistance element 14 and the housing 1 there is provided an electrical insulating material 15 sufficient to electrically insulate the housing 1 from the resistance element 14 but of insufficient thickness to interfere with the transfer of heat from the resistance element 14, through the housing 1 to the adsorption material 13. If desired, the insulating material 15 is a thin sheet of asbestos wound around housing 1. The heating element 14 preferably takes the form of a resistance wire wound around the casing 1 and insulating sheet 15 to form a helical coil. The ends of the coil are connected to suitable electrical conducting leads 16 and 17 which are connected with a source of electricity (not shown). Line 16 is provided with a switch 18.

Since air line 5, 7 is a small tube and since the shield 9 is likewise a small tubular wire gauze member, these elements present practically no resistance to the circulation or flow of air through the housing 1. Thus, when switch 18 is closed to energize the heating element 14, heat is conducted or transferred through the housing 1 to the "Silica Gel" and the thermal action sets up hot air currents which flow freely through the adsorbent material 13 to dry or reactivate the same.

Since the inlet 8, situated in the center of the adsorption material 14, the resistance to flow of air from each end of the casing 1 is the same. Therefore approximately the same quantities of air are drawn through each end of the housing 1, dehumidified by the hydrogel 13 preparatory to flowing through line 7, 5 to the ozone generating cell or other place of use.

I claim:

1. A drier for dehumidifying gas comprising a housing open at each end through which the gas passes preparatory to being dehumidified, a conduit for conducting the gas out of the housing having a relatively small inlet approximately centrally of the housing and extending partially across said housing, reactivatable vapor adsorbent material surrounding the inlet in approximately equal amounts between the inlet and the open ends of the housing, said conduit inlet being substantially completely surrounded in all directions by said vapor adsorbent material and an electrical resistance heating element mounted on the outside of the housing for heating the housing and adsorbent material to set up a flow of gas through the housing to reactivate the adsorbent material.

2. A drier for dehumidifying gas comprising a housing open at each end through which the gas passes preparatory to being dehumidified, means for conducting the gas out of the housing including a relatively small inlet positioned approximately at the midpoint of the housing and extending across a relatively small portion of the lateral area of said housing, reactivatable vapor adsorbent material surrounding the inlet in approximately equal amounts between the inlet and the open ends of the housing, said inlet being substantially completely surrounded in all directions by said vapor adsorbent material, and an electrical resistance heating element in the form of a wire wound around the outside of the housing for heating the housing and adsorbent material to set up a flow of hot gas through the housing to reactivate the adsorbent material.

3. A drier for dehumidifying gas comprising a housing open at each end through which the gas passes preparatory to being dehumidified, a conduit for withdrawing gas from the housing extending within the housing to approximately the midpoint of said housing, said conduit having a small inlet positioned approximately at said midpoint of the housing, reactivatable vapor adsorbent material surrounding the inlet in substantially all directions and being in approximately equal amounts between the inlet and the open ends of the housing, and an electrical resistance heating element helically wound on the outside of the housing for heating the housing and adsorbent material to set up a flow of gas through the housing to reactivate the adsorbent material.

4. A drier for dehumidifying gas comprising a housing open at each end through which the gas passes preparatory to being dehumidified, a conduit for withdrawing gas from the housing extending to approximately the midpoint of said housing, said conduit having an inlet end positioned approximately at said midpoint of the housing, a small foraminated hollow element positioned over the end of the conduit permitting gas to enter the conduit and barring the entry of the adsorbent material, reactivatable vapor adsorbent material substantially completely surrounding the foraminated element in all directions and in approximately equal amounts between the inlet and the open ends of the housing, and an electrical resistance heating element mounted on the outside of the housing for heating the housing and adsorbent material to set up a flow of gas through the housing to reactivate the adsorbent material.

5. A drier for dehumidifying gas comprising a housing open at each end through which the gas passes preparatory to being dehumidified, a conduit for withdrawing gas from the housing extending to approximately the midpoint of said housing, said conduit having an inlet end positioned approximately centrally of the housing, a tubular screen extending laterally of said housing through a relatively small portion of the lateral area of said housing, said tubular screen having one end closed and the other end open, said screen having its open end positioned over the inlet end of the said conduit with its closed end spaced from the inlet end of the conduit whereby the gas is free to enter the inlet end of the conduit and the adsorbent material is prevented from entering the conduit, reactivatable vapor adsorbent material surrounding the inlet in approximately equal amounts between the inlet and the open ends of the housing, said tubular screen being substantially embedded in said vapor adsorbent material and an electrical resistance heating element mounted on the outside of the housing for heating the housing and adsorbent material to set up a flow of gas through the housing to reactivate the adsorbent material.

ALBERT A. BUSCH.